United States Patent [19]

Smit

[11] Patent Number: 4,903,781
[45] Date of Patent: Feb. 27, 1990

[54] FLEXIBLE MOUNTING SYSTEM FOR AGRICULTURAL IMPLEMENTS

[75] Inventor: Edward H. Smit, Sheffield, Iowa
[73] Assignee: Sukup Manufacturing Company, Sheffield, Iowa
[21] Appl. No.: 202,538
[22] Filed: Jun. 3, 1988
[51] Int. Cl.$^4$ .............................................. A01B 61/02
[52] U.S. Cl. ................................. 172/316; 172/678; 172/449
[58] Field of Search ............... 172/678, 679, 680, 448, 172/439, 677, 624.5, 449, 497, 500, 117; 280/489, 405 B, 446 A, 461 A

[56] References Cited

U.S. PATENT DOCUMENTS

| | | | |
|---|---|---|---|
| 2,704,018 | 3/1955 | Oehler et al. | 172/448 X |
| 3,193,306 | 7/1965 | Pettit | 172/449 X |
| 3,228,179 | 1/1966 | van der Lely | 172/449 X |
| 3,235,286 | 2/1966 | Meadowcroft | 172/449 |
| 3,583,495 | 6/1971 | Cantval et al. | 172/449 X |
| 4,142,587 | 3/1979 | Woodward et al. | 172/449 X |
| 4,193,458 | 3/1980 | Meinert et al. | 172/445 X |

FOREIGN PATENT DOCUMENTS 165847  11/1985  Australia.
2453585  12/1980  France .................. 172/678

OTHER PUBLICATIONS

Glencoe Brochure of list assist wheel–Model HT.
Hiniker Brochure of lift assist wheels–Hiniker 5000 Cultivator.
Orthman Brochure of lift assist wheels–Series 756 and 757.

Primary Examiner—Randolph A. Reese
Assistant Examiner—Jeffrey L. Thompson
Attorney, Agent, or Firm—Neuman, Williams, Anderson & Olson

[57] ABSTRACT

A compact flexible mounting system for connection of an agricultural implement to a tractor includes a load transfer member pivotally attached to the upper stabilizing link of a three-point hitch and to the implement support frame to which the lower links of the hitch are attached. A compression spring is interposed between a portion of the load transfer member and a portion of the implement support frame to yieldably resist rotation of the pivotal load transfer member away from the tractor for stress relief purposes while transmitting down-pressure forces from the hitch to the implement.

19 Claims, 2 Drawing Sheets

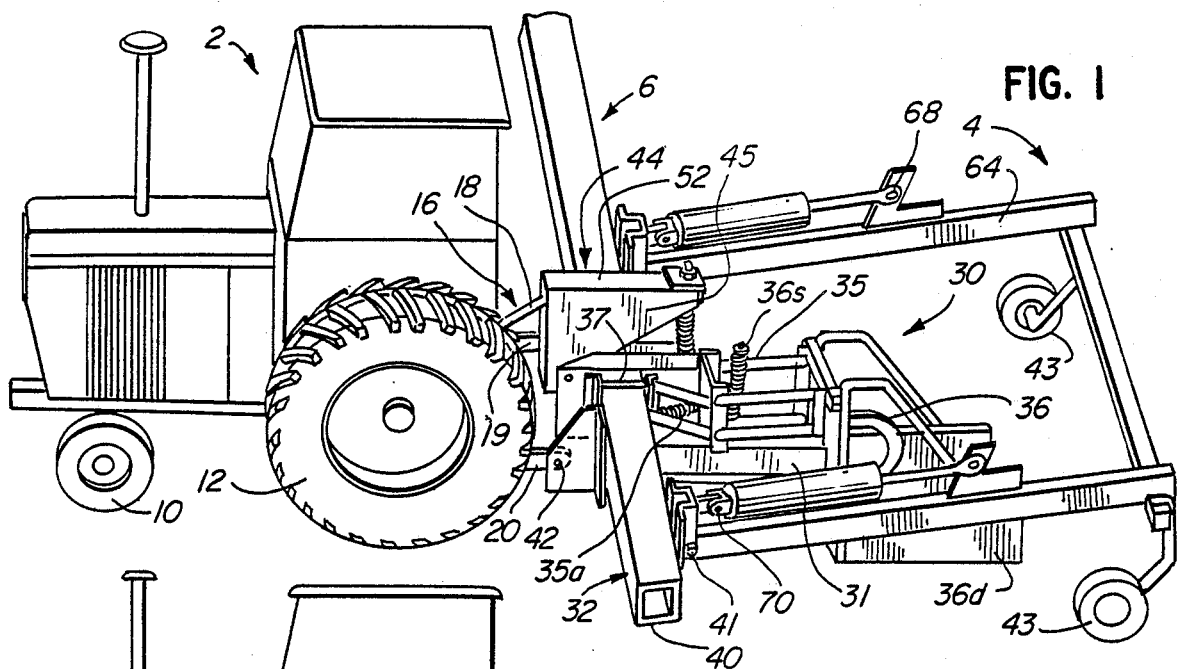
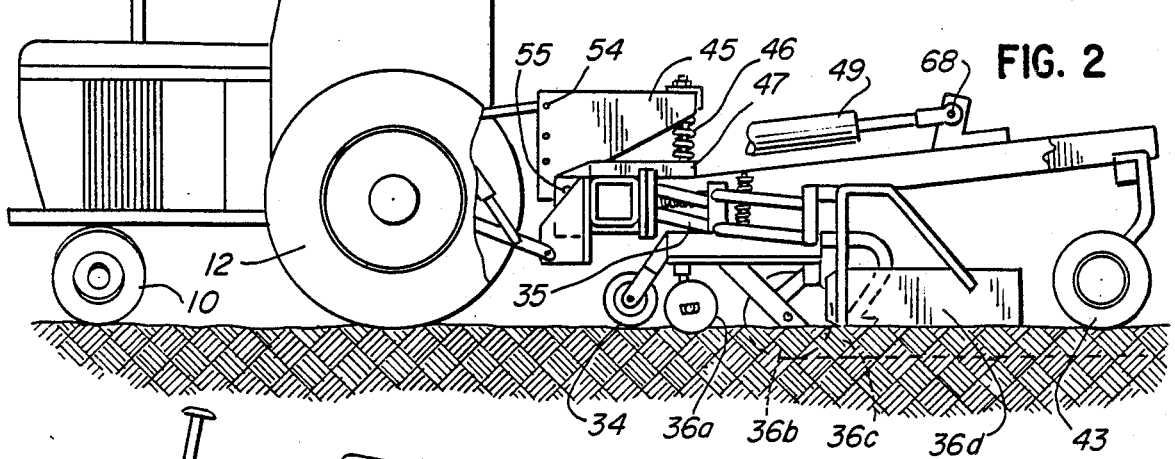
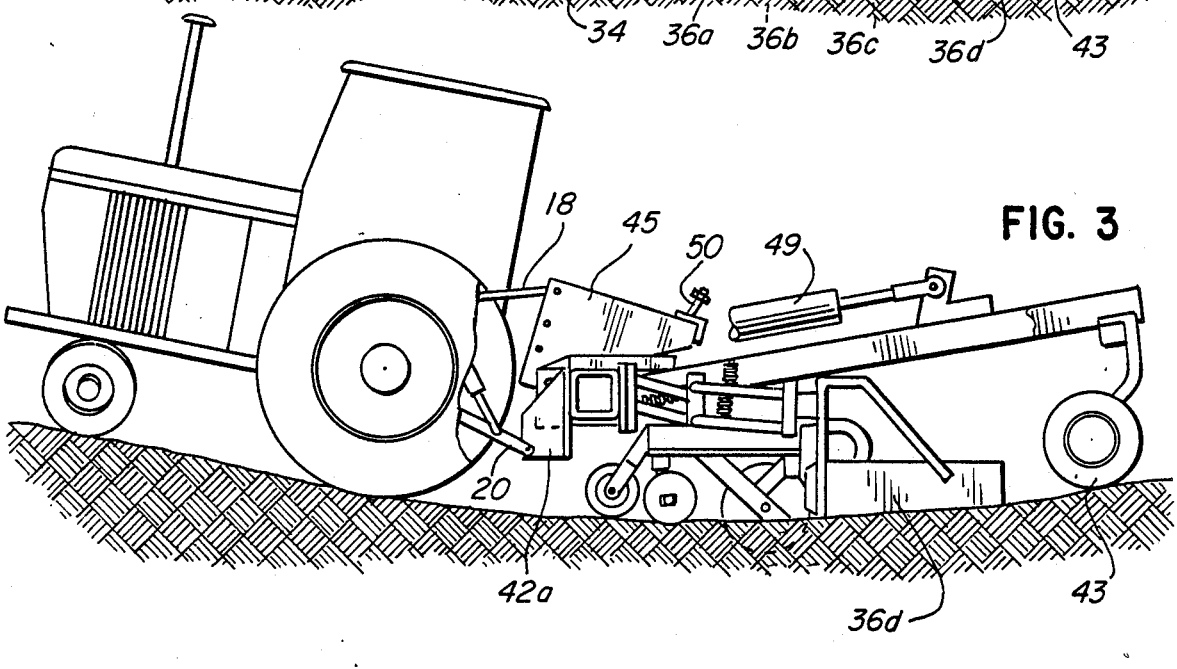

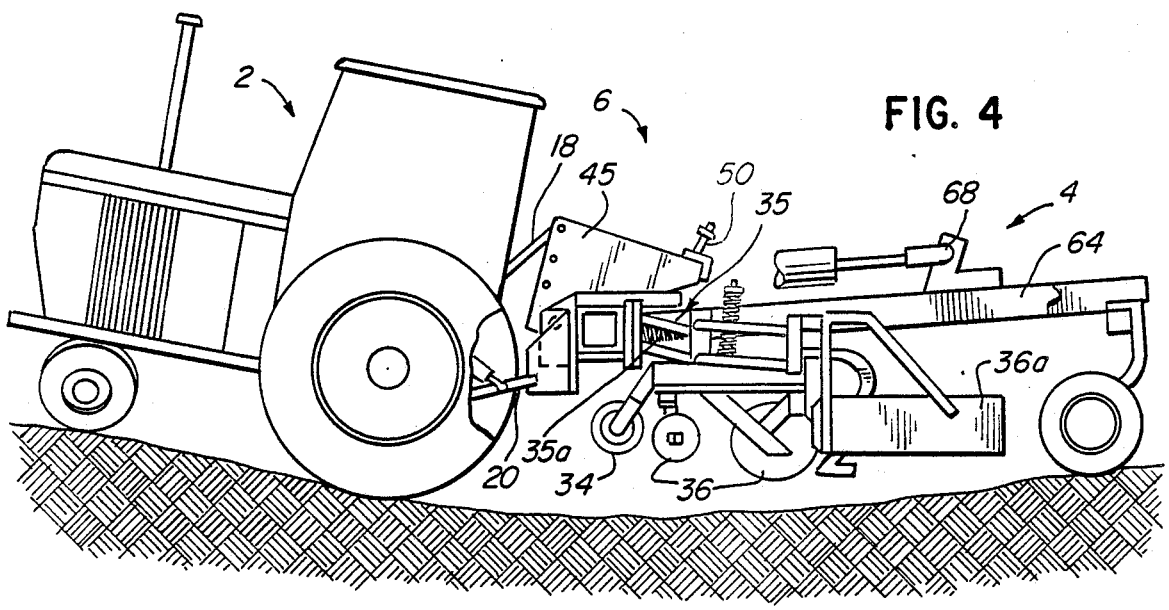
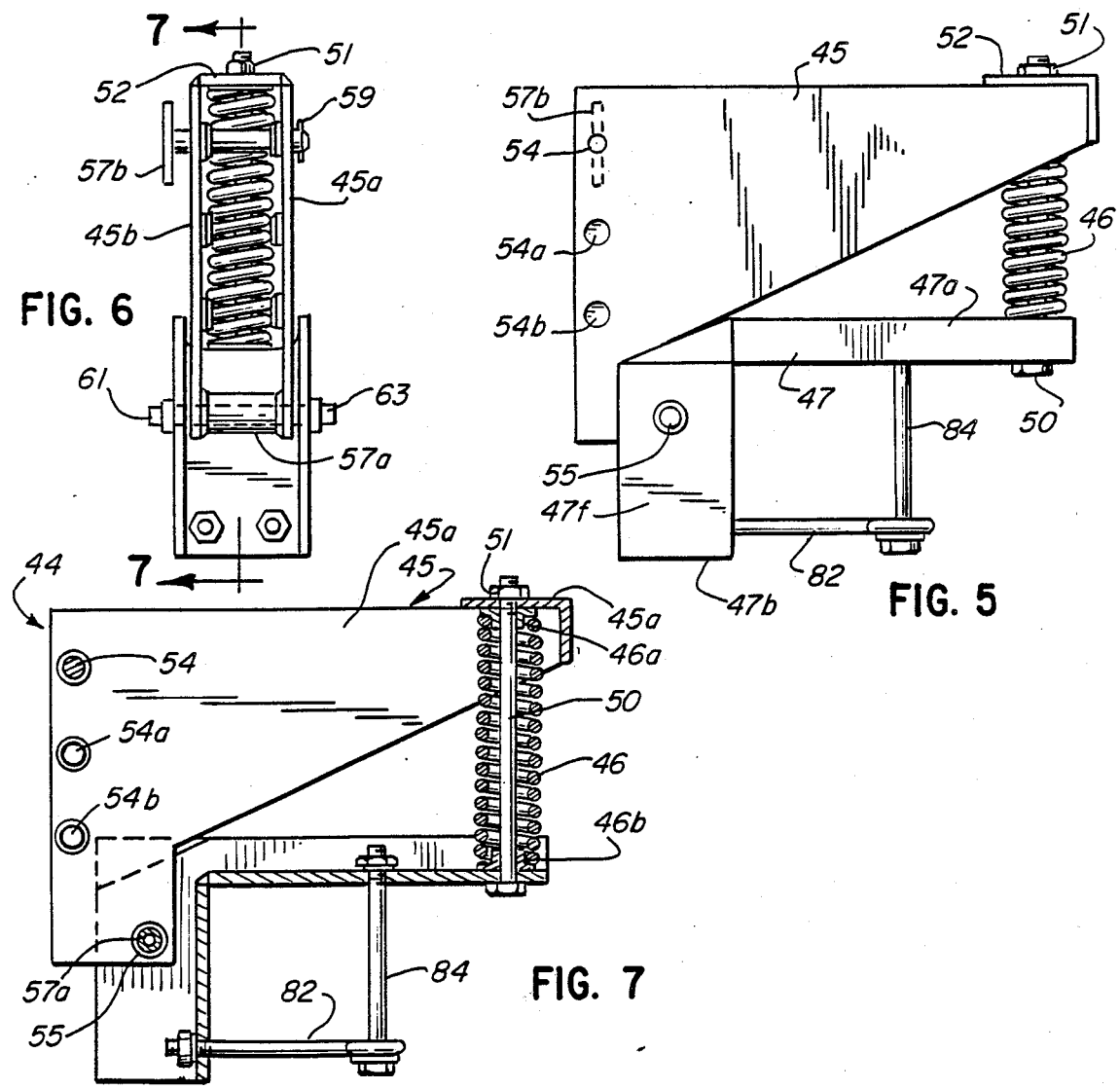

FLEXIBLE MOUNTING SYSTEM FOR AGRICULTURAL IMPLEMENTS

BACKGROUND OF THE INVENTION

1. Field of the Invention

The present invention relates to systems for connection of agricultural implements to tractors and particularly tool bar implements, especially those which include trailing lift assist units. More particularly, the present invention relates to a compact flexible system for connection of an agricultural implement to the three-point hitch of a tractor. The system includes a resiliently yieldable member which allows flexing between the tractor and the implement and yet provides for application of adequate down-pressure force to the implement from the tractor hitch when the implement is lowered for penetration into the ground.

2. Description of the Prior Art

A variety of systems for connection of trailing implements to a wheeled tractor have been developed in which the trailing implement is connected to the tractor by use of a conventional so-called three-point hitch. The lower links or arms of such hitches are driven by the hydraulic system of the tractor to provide operator-controlled lifting and lowering movement and forces to the attached implement. The upper or stabilizing link of these systems typically is used when the hitch system must maintain a particular, e.g. generally horizontal, pitch orientation of the implement and when the hitch system is used to transmit a positive down-pressure force to tillage tools or the like mounted on trailing portions of the attached implement.

During implement usage or when the implement is being lifted and transported, a number of forces are developed on the three-point hitch, the implement and the lift support member. The three-point hitch can provide upward lift by actuation of the power lift features of the lower support arms of the hitch. For example, the upward force is utilized for lifting and carrying the implement during transport from one location to another. During usage of the agricultural implement for tillage, the lift arms lower the implement and the combination of links, including the top link, and orient the implement in pitch to assure proper ground penetration of the tools. This often requires application of rearward compressive forces by the upper link. In ridge tillage systems, for example, pitch orientation force often is required on the implement to assist in forcing the tillage tools of the implement into the ground.

Many such implements also include a trailing wheeled lift assist support system. This is most common in heavy implements where it would be impractical or even impossible to carry the full weight of the implement in cantilever fashion on the tractor hitch system. Such trailing lift assist support systems typically include support members pivotally attached to the main frame of the implement, with one or more ground contact wheels or the like mounted on each support member behind the implement. A power lift means such as a hydraulic lift cylinder normally is included for actuation from the hydraulic system of the tractor when it is desired to transfer a portion of the weight of the implement to the trailing support system. The rear wheeled lift assist supports act in concert with the three-point hitch by selectively providing upward lift on the implement. This includes, of course, the situation where the implement tools are to be lifted clear of the ground, such as for turning at the end of a field or for transport. However, it will be appreciated that in this condition, the tractor and trailing implement constitute a rather long rigid system, from the front wheels of the tractor to the trailing support wheels.

Thus, while in the lifted position, the entire system of the tractor and trailing lift assist support members act as a fixed body with the implement carried in between the two units. During movement in this lifted position, however, the tractor may be tilted in pitch with respect to the rear lift support member as the combination passes over uneven terrain. The system therefore preferably allows for flexing as the tractor and rear wheeled lift support member pass over uneven ground.

Similarly, when the implement is being used in engagement with the soil, flexibility in pitch is important when traversing uneven ground, though perhaps not as critical. In that circumstance, the rear support assist mechanism normally is not activated and thus is free-floating, thereby resulting in a shorter effective length of the rigid system. Similar considerations apply with implements which do not include trailing lift assist means. While flexibility thus is important, the system must also provide pitch orientation with enough compressive force to maintain the tools in desired penetration of the ground.

Various arrangements of linkages have been proposed for providing yieldable interconnections between three-point hitches and the trailing frames of implements. However, most such systems are not adapted for tool bar types of implements, i.e., where a plurality of relatively independent tool gangs are attached to a transverse tool bar and are vertically movable relatively independent of one another within the range of their operative engagement with the soil. Such gangs typically trail the tool bar and have integrated down-pressure means on each gang unit. Application of orientation forces on the tool bar from the tractor remains desirable in many such instances to control and selectively increase or decrease the effective down-pressure forces across all of the individual gang units. However, there is no integrated frame rearward of the tool bar for transmitting such forces to the units. Therefore, the forces must be applied via the tool bar itself. At the same time, stress relief must be provided for the hitch linkages to avoid damage due to overloading within reasonably foreseeable operational circumstances.

The system of the present invention for connection of agricultural implements to the three-point hitch of a tractor is a compact system particularly suitable for tool bar type of implements where there is no long rigid frame for application of anti-pitch stabilizers and stress relief linkages. (Such implements which constitute tool bar and equivalent types sometimes are referred to herein as short frame implements, the term "short" referring to the longitudinal dimension in the direction of normal operation of the implement.) Moreover, the present system includes a resiliently yieldable means which provides resilient interconnection with high compressive force transfer capability to allow flexing and yet provide adequate orientation and attendant down-pressure forces to the tool bar when the implement is lowered for penetration of the tools into the ground.

OBJECTS OF THE INVENTION

It is an object of this invention to provide an improved flexible system for connection of agricultural implements to the three-point hitch of a tractor.

It is a specific object of this invention to provide a flexible system for connection of tool bar types of agricultural implements to a tractor and which transmits high down-forces yet avoids damaging overloads in the hitch system under reasonable conditions of pitch variation such as in traversing uneven ground. It is a further object of this invention to provide a flexible system for short frame agricultural implements which allows flexibility in pitch when the implement is in engagement with the ground and yet provides sufficient compressive force to maintain the implement tool in a working position.

It is a further object of this invention to provide a flexible system for connection of agricultural implements to a tractor which overcomes the deficiencies of the prior art.

Other objects, advantages and features of the present invention will become apparent upon reading the following detailed description and appended claims, and upon reference to the accompanying drawings.

SUMMARY OF THE INVENTION

In accordance with one embodiment of this invention, a flexible mounting or hitch system which achieves the foregoing objects is provided for connection of a short frame agricultural implement to a tractor through a three-point hitch.

The system includes an agricultural implement with a tool bar type of support frame and a pivotal load transfer member. The support frame is attachable to the lower support arms of the three point hitch. The load transfer member is pivotally attachable to the upper link of the three-point hitch. The load transfer member is also pivotally attached to the support frame at a pivot joint which is located between the upper and lower hitch link connections. A resiliently yieldable compression member is interposed between a portion of the load transfer member and another element fixed to the support frame to yieldably resist relative pivotal movement of the load transfer member in a direction away from the attached link. The compression member is preferably in the form of a coil spring. Means also is provided to preclude relative pivotal movement in the opposite direction. Thus, compressive forces may be transmitted from the upper hitch link to the implement for pitch orientation and down force purposes while providing internal pitch flexibility within the system.

BRIEF DESCRIPTION OF THE DRAWINGS

For a more complete understanding of this invention, reference is made to the preferred embodiment illustrated in greater detail in the accompanying drawings and described below by way of an example of the invention. In the drawings:

FIG. 1 is a perspective view of a tractor and trailing implement with a flexible mounting system employing teachings of this invention, with only one implement tool gang being shown for illustrative purposes, the others being omitted;

FIG. 2 is a side view of the tractor and implement system of FIG. 1 with the implement in operational use on substantially level ground and the near-side lift assist support broken away for clarity;

FIG. 3 is a side view of the tractor and implement system similar to FIG. 2, on uneven ground;

FIG. 4 is a side view of the system of FIG. 1 with the implement in a raised or inoperative transport condition, traversing uneven ground;

FIG. 5 is a side view of the load transfer member assembly of the implement of FIG. 1, with an upper attachment pin;

FIG. 6 is a left end view of the assembly of FIG. 5; and

FIG. 7 is a sectional view of the assembly of FIGS. 5 and 6 taken generally along line 7—7 of FIG. 6.

DETAILED DESCRIPTION OF THE DRAWINGS

Turning now to the drawings, FIG. 1 shows a perspective view of a wheeled tractor 2 and an agricultural implement 6 with a rear wheeled lift support assembly 4. The tractor 2 includes two sets of ground contacting wheels, a front set 10 and a rear set 12. The rear wheels 12 serve as the primary traction transmission point for the system.

A standard three-point hitch, shown generally at 16, extends rearwardly from the tractor. The three point hitch system 16 includes an upper stabilizing link 18 and a pair of lower links 19, 20, each pivotally connected to the tractor. The lower links 19, 20 transmit draft or towing forces. The lower links 19, 20 also are pivoted in a vertical plane by the hydraulic system of the tractor for positioning purposes and for providing lifting and lowering forces in the conventional manner.

The agricultural implement 6 is shown in a side view on substantially level ground in FIG. 2 and on uneven ground in FIGS. 3 and 4. The implement 6 includes a support frame 32 comprising primarily a box beam tool bar 40. The implement 6 comprises basically a known high residue cultivator but may be any tool bar type of implement typically provided with a conventional three-point hitch system. The tool bar provides locations for mounting most or all of the other components in any suitable fashion. The components illustrated somewhat schematically in the drawings typically include a plurality of suitably spaced tillage gangs 30 in accordance with the width of the implement and/or the number of crop rows to be planted, tilled or otherwise treated. A single gang is illustrated in FIG. 1, the others being omitted. Each gang may include a subframe 31 carrying suitable tillage tools 36a, 36b, 36c, guides or gauge wheels 34, shields 36d and the like, with a parallelogram linkage 35 connecting each unit to the tool bar such as by a clamping bracket 37. Means such as tension springs 35a in the parallelogram linkage transmits down-pressure forces from the tool bar to the subframe 31 of the respective gang 30. Thus, each gang unit floats vertically substantially free of each other unit 30 when in operation yet receives supplemental down forces from the common tool bar 40 to which all are attached. In regard to such implements, see also, for example, the copending application Ser. No. 125,242 of John A. Hanig, filed Nov. 25, 1987 which is incorporated herein by this reference. Springs 36s or other trip spring means apply releasable positioning force to the shanks of the tillage sweeps 36c.

Trailing support lift assist assemblies 4 also are attached to the frame at the tool bar, as at pivots 41, and include ground-contacting support wheels 43 for carrying a portion of the weight of the implement when activated in the conventional manner. To this end, a support beam 64 exends between the implement 6 and each of the wheels 43. A hydraulic lift system 49 is operatively connected between each beam 64 and the support frame 32. The hydraulic system 49 is connected to the respective beam at rear connection 68 and to the tool bar of the frame at forward connection 70, shown best in FIG. 1. Each hydraulic cylinder drive unit 49 also is connected to the hydraulic system of the tractor in a known manner. When the respective hydraulic piston is extended, thereby forcibly rotating the respective lift assembly clockwise as seen in FIGS. 2-4, a portion of the weight load of the implement is transferred to the wheels 43, thereby to assist in lifting and carrying the implement. Of course, the implement also is being carried on the three-point hitch system.

The support frame 32 is connected to the lower links 19, 20 of the three-point hitch at two spaced coaxial front beam connection pivots 42 on brackets 42a affixed to the beam, in a known manner.

A load transfer link assembly 44 is included as a part of the implement hitch system to allow yieldable stress relieving flexibility between the tractor and the implement. This assembly includes a load transfer member 45 which is pivotable relative to and over the main frame bar, in a pivot direction away from the link attachment points and against the yieldable resistance of a resiliently yieldable means in the form of compression spring 46, to transfer the necessary stabilizing pitch orientation and down-pressure forces to the implement while protecting the upper link and related components from compressive overload damage. Referring particularly to FIGS. 5-7, the assembly 44 comprises, in addition to the upper pivot bracket or member 45, a bottom bracket 47 with means such as clamping bolts 82, 84 for fixing it to the beam 40 of the main frame. Thereby the bottom bracket 47 provides support for the compression member 46 on the main frame. As illustrated, the bracket 47 is L-shaped, comprising an upper shallow channel leg 47a and a vertical channel leg 47b with deeper flanges 47f. In FIGS. 2, 3 and 4, the compression member 46 is shown in its preferred embodiment of a coil spring. However, it is to be understood that the member may be of other forms and structures, e.g., such as compressive materials, nitrogen accumulators, air cylinders, or the like, and still be within the intended scope of the invention.

Upper support for the compression member 46 is provided by an abutment plate 52 at the outer distal end of the pivotable bracket member 45. The member 45 may be a box-like structure or a pair of parallel plates joined by the plate 52 and by a bearing sleeve 57a, with the compression member therebetween. The compression member 46 is secured in position relative to the top bracket 45 and bottom bracket 47 by end plugs 46a, 46b and a bolt 50 which extends through the center of the compression member as well as through the bracket 47 and the plate 52 of the member 45, as shown. The flat plate 52, or the like, can form a base for the bolt 50, which is secured by locknut 51, along the top side of the top bracket 45. The bolt 50 also serves as a limit stop in respect to rotation of the pivotable member 45 toward the hitch and as a tension member to transfer lifting and stabilizing forces from the hitch to the implement. The openings in plate 52 and bracket 47 for the bolt 50 are oversize relative to the bolt diameter to allow free sliding of the bolt therethrough and tilting of the bolt as the member 45 pivots about its pivot axis at 55, see, e.g. FIGS. 3 and 4.

The member 45 is designed to be pivotally connected to the upper stabilizing link of the three point hitch at first pivot connection bosses 54, 54a or 54b and is pivotally connected to the bottom bracket 47 at a second pivot connection 55. A typical connecting pin 57b is illustrated in the top position 54 and is secured by a pin clip 59. The second pivot connection 55 includes a bearing shaft 61 which extends through the sleeve 57a of member 45 and the flanges 47f and is secured by locknut 63.

The bottom bracket is shown in more detail in FIG. 7. The bottom bracket 47 is supported by clamp bolts 82, 84. The bolts 82, 84 extend around the outside of the tool bar and provide a mounting for affixing the assembly 44 to the tool bar.

The alternate pivot connections 54, 54a, 54b allow the attachment of hitches of varying sizes or categories.

In one current embodiment of the assembly 44, the vertical dimension between the centerlines of the first pivot connection 54 and the first auxiliary pivot connection 54a is 4 inches; between the first auxiliary pivot connection 54a and the second auxiliary pivot connection 54b is $3\frac{3}{4}$ inches; between the second auxiliary pivot connection 54b and the second pivot connection 55 is $4\frac{5}{8}$ inches; and between the second pivot connection 55 and the connections 42 is 11 inches. In that embodiment, the horizontal dimension from the centerline of the second pivot connection to that of the spring 46 is $15\frac{1}{2}$ inches. In that embodiment, the spring is a 3 inch outer diameter and $\frac{1}{2}$ inch wire diameter coil spring. The spring is 12 inches long when unloaded and is compressible a maximum distance of $3\frac{1}{2}$ to 4 inches when under load with a spring rate of about 580 pounds per inch.

The load transfer assembly 44 may also be utilized with a standard quick-attaching coupler (not shown) on the tractor. With such a coupler, the lower and upper sockets of the quick-attaching coupler connect to the load transfer member 45 and support frame 32 at the same connections as the three-point hitch system without coupler.

While the pivot member 45 is illustrated with a particular configuration and as part of an integrated subassembly 44, it will be understood that the design may be varied and the components may be incorporated into implements in various configurations.

In operation, the assembly 44 with compression member 46 is mounted on and operates entirely upon the tool bar and yet allows flexing in the connection between the implement 6 and the tractor 2. The compression member provides a yieldable or flexible link between the implement and the tractor 2 as the tractor 2 and implement traverse uneven ground. Such a flexible link allows angular movement within the tractor and implement system, particularly when the tractor and implement are driven through a sharp "draw" or valley. In such a situation, major forces will be applied tending to fold or "bend" the system in the vertical plane. Insertion of the compression member satisfies this problem by permitting flexing in pitch at this joint when under such overload conditions, as is illustrated in FIGS. 3 and 4.

The flexing assembly is compact. The load transfer member 45 and flexible link system also allow for a short lever arm between the upper link of the three-point hitch and the second pivot connection. The moment created by the upper link about the second pivot connection can be easily counter-balanced by the counter-moment or resisting moment of the compression spring, which acts with a longer lever arm.

When the implement 6 is in the lowered position for tillage, the compression member 46 is sufficiently strong to preclude forward pivoting of the implement about the hitch connections 42 and thereby to insure transmission of desirable pitch orientation and thus downforces to the tillage tools.

Thus, a flexible system for connection of a short frame tool bar type of agricultural implement to the three-point hitch of a tractor has been provided. The system includes a resiliently yieldable member which allows flexing for stress relief and yet which provides adequate down-pressure force when the implement is lowered for penetration into the ground.

It will be appreciated that the aforestated objects have been met.

While one preferred embodiment of the invention is illustrated and certain variations have been alluded to, it will be understood, of course, that the invention is not limited to these embodiments. Those skilled in the art to which the invention pertains may make modifications and other embodiments employing the principles of this invention, particularly upon considering the foregoing teachings.

What is claimed is:

1. An implement having a short frame, a plurality of tool gangs attached to said frame, each of said gangs being movable vertically relative to the other of said gangs and relative to said short frame, and a hitch arrangement for attachment to the hitch mechanism of a tractor which includes lower lift link means and upper stabilizer link means, said hitch arrangement including first attachment means affixed to said short frame for engagement with said lower lift link means and for lifting of said implement thereby, a load transfer member pivotally attached to said short frame for pivoting movement relative to said frame, second attachment means on said load transfer member for engagement with said upper stabilizer link means, support means on said short frame for supporting a resiliently yieldable means, and means engaging said load transfer member and said support means for resiliently resisting pivotal movement of said load transfer member in a direction away from a link engaged with said second attachment means and thereby transmitting compressive forces from said hitch mechanism to said implement in a predetermined relative pitch orientation of said implement and permitting relative pitch movement between said tractor and said implement for stress relief of said hitch.

2. The invention of claim 1 wherein said short frame is a tool bar.

3. The invention of claim 1 wherein said short frame is a tool bar and said load transfer member, said support means and said means for resiliently resisting pivotal movement are disposed over said tool bar.

4. The invention of claim 1 wherein said load transfer member is attached to said short frame for such pivotal movement about a pivot axis disposed between said first attachment means and said second attachment means.

5. The invention of claim 1 wherein said support means is a first bracket affixed to said tool bar, said load transfer member is a second bracket pivotally connected to said first bracket and said means for resiliently resisting pivotal movement is operatively joined to said brackets.

6. The invention of claim 1 wherein said support means is a first bracket affixed to said tool bar, said load transfer member is a second bracket pivotally connected to said first bracket and said means for resiliently resisting pivotal movement is a compression spring confined between and acting against said brackets.

7. The invention of claim 6 including a tension member telescopically connected between said brackets for limiting pivotal movement of said load transfer member in a direction toward said stabilizer link means connected thereto.

8. The invention of claim 7 wherein said first attachment means is a portion of said second bracket.

9. The invention of claim 1 wherein said means for resiliently resisting pivotal movement of said load transfer member is a compression spring.

10. The invention of claim 9 wherein said spring is disposed between a portion of said load transfer member remote from said pivotal attachment and said support means.

11. The invention of claim 1 wherein said implement includes ground-engaging lift assist means remote from said hitch arrangement.

12. The invention of claim 11 wherein said lift assist means is at the rear of said implement.

13. The invention of claim 12 wherein said lift assist means comprises ground-engaging wheels and means for selectively transferring a portion of the load of said implement to said wheels.

14. The invention of claim 1 and including means for preventing pivotal movement of said load transfer member in a direction opposite said first-mentioned direction.

15. An implement having a transversely extending short frame for attachment of tool gangs and a hitch arrangement for attachment to the hitch mechanism of a tractor which includes lower lift link means and upper stabilizer link means, a ground engaging lift assist means comprising at least one load beam pivotally attached to said short frame and extending rearwardly of said implement from said short frame, a ground-engagement wheel on a distal portion of said load beam, and means for selectively transferring load from said short frame to said load beam, said hitch arrangement including first attachment means secured to said short frame for engagement with said lower lift link means and for lifting of said implement thereby, a load transfer member pivotally attached to said short frame for pivoting movement relative to said short frame about a pivot axis disposed above said first attachment means, second attachment means on said load transfer member for engagement with said upper stabilizer link means, support means on said short frame, including a support portion disposed rearwardly of said pivotal attachment of said load transfer member to said short frame and means engaging said load transfer member and said support portion of said support means for resiliently resisting pivotal movement of said load transfer member in a direction away from a link engaged with said second attachment means and yieldably permitting significant pivotal movement therebetween under stress conditions, thereby permitting substantial angular pitch movement between said implement and a tractor connected to said implement through said load transfer assembly during such stress conditions.

16. In an agricultural implement having a transversely extending short frame for attachment of tool gangs, a load transfer assembly for flexibly connecting said short frame to a tractor, said load transfer assembly comprising:
- a top bracket member including means for engaging a link of a three-point hitch;
- a bottom bracket member pivotally attached to said top member;
- means for affixing said bottom bracket member to said implement short frame;
- a compression member for resiliently resisting relative pivotal movement between said top bracket member and said bottom bracket member in a first direction;
- said compression member engaging said top bracket member and said bottom bracket member and yieldably permitting significant pivotal pitch movement therebetween under stress conditions, said load transfer assembly thereby permitting substantial angular pitch movement between said implement and a tractor connected to said implement through said load transfer assembly during such stress conditions; and
- a tension member operatively connected between said bracket members for limiting relative pivotal movement therebetween in a second direction opposite said first direction.

17. The invention of claim 16 wherein said top bracket member comprises a pair of spaced parallel plates, and said tension member is a bolt disposed between said plates.

18. In a tractor and agricultural implement combination, a flexible mounting system for connection of said agricultural implement to said tractor comprising:
- a three-point hitch having an upper link and a plurality of lower support links, said upper link having a first end pivotally connected to the rear of said tractor, and each of said lower links having a first end pivotally connected to the rear of said tractor;
- a transversely extending short frame for attachment of tool gangs, said short frame traversing a portion of said agricultural implement, said short frame being pivotally attached to a second end of each of said hitch lower support links;
- a load transfer member having a forward portion and a longitudinally spaced rearward portion and first and second pivot connections, said first pivot connection located in said forward portion and being pivotally attached to said upper link at the second end of said upper link, said second pivot connection located in said forward portion and being pivotally attached to said short frame; and,
- a resilient compression member interposed between said rearward portion of said load transfer member and a support disposed rearwardly of said first and second pivot connections and affixed to said short frame, for yieldably permitting rotation of said load transfer member about said second member pivot connection in a direction away from said tractor under stress conditions, thereby permitting substantial angular pitch movement between said implement and said tractor connected thereto through said flexible mounting system during such stress conditions.

19. The invention of claim 18 wherein said implement includes a rear lift support member pivotally attached to said short frame, and actuating means for effecting relative pivotal movement between said rear lift support member and said short frame for supporting said implement in part on said rear lift support member.

* * * * *